United States Patent [19]

Matsuo et al.

[11] Patent Number: 5,480,509
[45] Date of Patent: Jan. 2, 1996

[54] LAMINATING APPARATUS

[75] Inventors: Kazuhiro Matsuo, Tokyo; Yoshihiko Kitahara, Toride; Shinya Endo, Mitsukaido; Yoichi Tagawa, Ushiku, all of Japan

[73] Assignees: Canon Kabushiki Kaisha, Tokyo; Canon Aptex Inc., Ibaraki, both of Japan

[21] Appl. No.: 136,603

[22] Filed: Oct. 14, 1993

Related U.S. Application Data

[63] Continuation of Ser. No. 735,632, Jul. 25, 1991, abandoned.

[30] Foreign Application Priority Data

Jul. 27, 1990 [JP] Japan ..................... 2-200365
Jul. 27, 1990 [JP] Japan ..................... 2-200366

[51] Int. Cl.⁶ .................................................. B32B 31/00
[52] U.S. Cl. .......................... 156/522; 156/516; 156/555; 100/93 RP; 83/694
[58] Field of Search .................................... 156/522, 542, 156/510, 516, 324, 555, 583.1, 583.8; 100/93 RP; 83/694

[56] References Cited

U.S. PATENT DOCUMENTS

| | | | |
|---|---|---|---|
| 3,027,285 | 3/1962 | Eisner et al. | 156/583.1 X |
| 3,840,420 | 10/1974 | Sarcia | 156/358 |
| 3,944,455 | 3/1976 | French | 156/542 X |
| 4,285,752 | 8/1981 | Higgins | 156/522 X |
| 4,619,728 | 10/1986 | Brink | 156/555 |
| 4,623,422 | 11/1986 | Lindquist | 156/583.5 |
| 4,648,299 | 3/1987 | Siegfried | 83/150 |
| 4,743,334 | 5/1988 | Singer | 156/499 |
| 5,019,203 | 5/1991 | Singer | 156/309.9 |
| 5,080,751 | 1/1992 | DeWan | 156/579 |
| 5,162,069 | 11/1992 | Morris | 156/542 X |

*Primary Examiner*—David A. Simmons
*Assistant Examiner*—J. Sells
*Attorney, Agent, or Firm*—Fitzpatrick, Cella, Harper & Scinto

[57] ABSTRACT

A laminating apparatus for performing a laminate treatment by sandwiching a laminate object with laminate films, comprising a laminate film containing device for containing laminate films, a sandwiching device for sandwiching a laminate object with the laminate films fed from the laminate film containing device, and a feeding device for feeding the laminate films from the laminate film containing device to the sandwiching device. The laminate film containing device and the feeding device are formed as a unit which is removably mounted on the laminating apparatus.

27 Claims, 17 Drawing Sheets

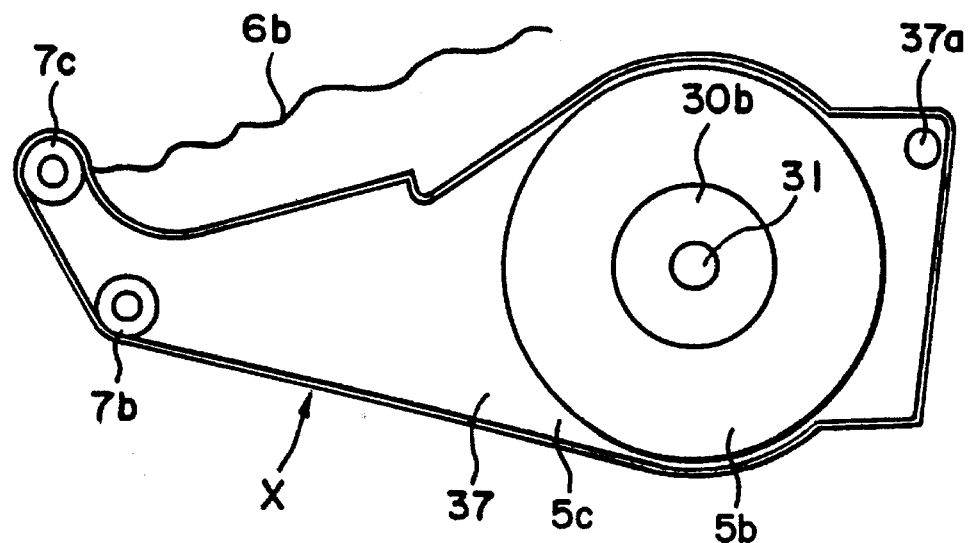
F I G. 4
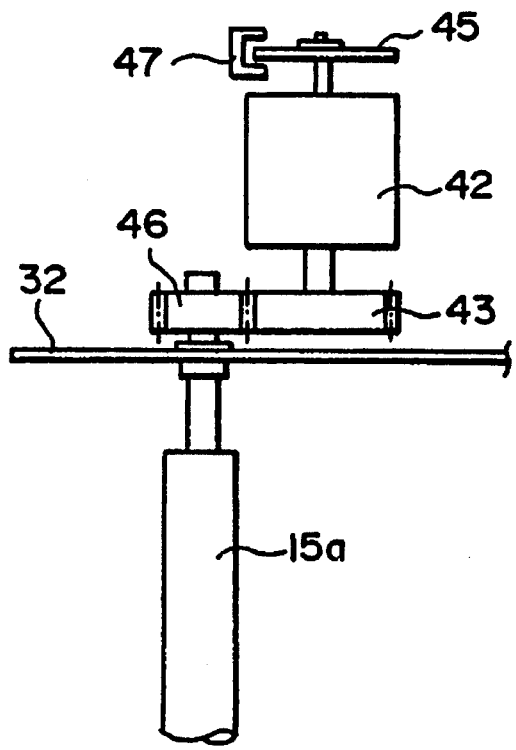
F I G. 5

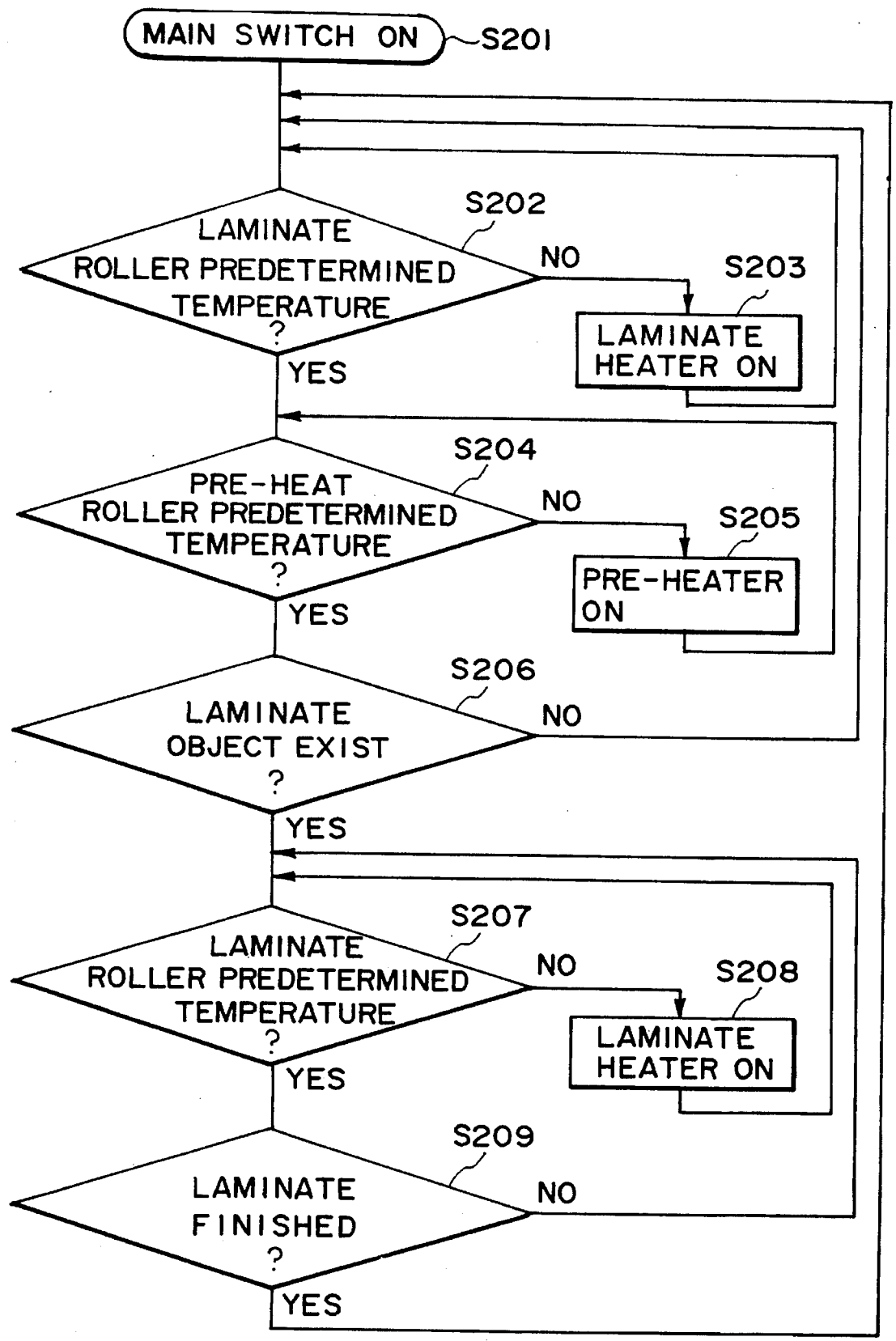
F I G. 7

SEPARATION

SET FINISHED

CUT

LAMINATING APPARATUS

This application is a continuation of application Ser. No. 07/735,632filed, Jul. 25, 1991, now abandoned.

BACKGROUND OF THE INVENTION

1. Field of the Invention

The present invention relates to a laminating apparatus wherein a laminate object (object to be laminated) is encapsuled by heat-reactive upper and lower laminate films to perform a laminate treatment, by heating and pressurizing the laminate films while sandwiching the laminate object between the laminate films.

2. Related Background Art

In the past, a laminating apparatus wherein an appearance and preservation of a sheet-shaped laminate object are improved by performing a laminate treatment while encapsuling and sealing the object between laminate films has been proposed.

FIG. 17 shows an example of such conventional laminating apparatus.

In FIG. 17, a laminating apparatus 100 includes an upper laminate film roll 101a of an upper heat-reactive laminate film 102a and a lower laminate film roll 101b of a lower laminate film 101b. The laminate films 102a, 102b unwound from the respective laminate film rolls 101a, 101b are wound around respective pressure and heat rollers 103a, 103b which are urged against each other and are tensioned by pull rollers 105a, 105b. The pressure and heat rollers 103a, 103b include heaters 106a, 106b for heating the rollers therein, respectively.

From a platform 109 disposed at an upstream side of the paired pressure and heat rollers 103, a laminate object 110 is fed to a nip between the pressure and heat rollers 103a, 103b which comprises a joining point for the upper and lower laminate film 102a, 101b. The laminate object 110 is sandwiched by the upper and lower laminate films 102a, 102b and is pressurized and heated by the paired pressure and heat rollers 103, so that it is adhered between the laminate films. Thereafter, the laminate object sandwiching by the laminate films is ejected out of the apparatus by means of the paired pull rollers 105. Trailing ends of the laminate films 102a, 102b sandwiching the laminate object therebetween are cut by a cutter unit 111 arranged at a downstream side of the paired pull rollers 105.

Above a body of the apparatus 100, there is arranged an operation portion 113 which has switches 115, 116 for manually setting the feeding speeds of the laminate films 102a, 102b and of the paired pull rollers 105, and the temperature of outer surfaces of the paired pressure and heat rollers 103.

Next, a dividable or openable construction of the conventional laminating apparatus will be explained with reference to FIG. 18.

In FIG. 18, the laminating apparatus 100 comprises an upper or first body frame 100a and a lower or second body frame 100b. The first body frame 100a is pivotally connected to the second body frame 100b via a support shaft 120. The upper laminate film roll 101a, the upper pressure and heat roller 103a, an upper tension roller 121a and the like are contained in the first body frame 100a. Similarly, the lower laminate film roll 101b, a lower tension roller 121b, the lower pressure and heat roller 103b, the upper and lower pull rollers 105a, 105b and the cutter unit 111 including an upper cutter blade 111a and a lower cutter blade 111b are contained in the second body frame 100b.

Next, the loading of the laminate films 102a, 102b to the laminating apparatus will be explained.

After the laminate film 102b unwound from the laminate film roll 101b is passed around the tension roller 121b, and the pressure and heat roller 103b, a leading end of the laminate film 102b is introduced into a nip between the paired pull rollers 105, and then the paired pull rollers 105 are rotated by manipulating a handle (not shown).

Then, after the laminate film 102a unwound from the laminate film roll 101a is passed around the tension roller 121a and the pressure and heat roller 103a, a leading end of the laminate film 102a is introduced into the nip between the paired pull rollers 105, and then the paired pull rollers 105 are rotated by manipulating the handle to insert the upper and lower laminate films 102a, 102b into a cutting opening of the cutter unit 111. Thereafter, the first body frame 100a is closed and is locked to the second body frame 100b, thus permitting the laminating operation.

However, in the respective above-mentioned conventional laminating apparatus, when the residual film amounts of the laminate film rolls 101a, 101b are lessened or when the laminate film rolls 101a, 101b are replaced by new laminate film rolls of laminate films 102a, 102b having different thicknesses, to use the an operator must insert a mandrel into the laminate film rolls 101a, 101b and to load the laminate film rolls 101a, 101b to the laminating apparatus.

Further, after the laminate film rolls 101a, 101b have been loaded in the laminating apparatus, the operator had to unwind the laminate films 102a, 102b from the laminate film rolls and to set the films around the tension rollers 121a, 121b, and the paired pressure and heat rollers (laminate rollers) 103 in a manual operation using his hands. Accordingly, since the loading and setting of the laminate films 101a, 101b caused the poor operability and required expert skill, there arose a problem that it took a long time for replacing the film rolls.

Further, in the above-mentioned conventional laminating apparatus, even when the first body frame 100a is opened, the pull rollers 105a, 105b are not separated from each other and the upper and lower cutter blades 111a, 111b of the cutter unit 111 are also not separated from each other. Accordingly, when the operator loads the laminate films into the laminating apparatus, he can not manually bring the leading ends of the laminate films to predetermined positions correctly while checking them with his eyes, with the result that the laminate films 102a, 102b were used wastefully and it was difficult to align the lateral edges of the films with each other. In addition, due to the poor resiliency of the Laminate films 102a, 102b, it was difficult to insert the leading ends of the films into a narrow gap between the cutter blades of the cutter unit 111. Furthermore, since the films 102a, 102b were adhered to surrounding metallic portions due to the static electricity on the films 102a, 102b, it was difficult to pass the films 102a, 102b through the cutter unit 111.

SUMMARY OF THE INVENTION

The present invention aims to eliminate the above-mentioned conventional drawbacks, and has object to provide a laminating apparatus which facilitates the loading of laminate films to the apparatus.

In order to achieve the above object, the present invention provides a laminating apparatus for performing a laminate treatment by encapsuling a laminate object with laminate films, comprising a laminate film containing means for containing the laminate films, a sandwiching means for sandwiching the laminate object with the laminate films fed from the laminate film containing means, and a feeding means for feeding the laminate films from the laminate film containing means to the sandwiching means, and wherein the laminate film containing means and the feeding means are formed as a unit and the unit is removably mounted on the apparatus.

More specifically, the laminate film containing means includes a plurality of laminate film rolls each comprising by a laminate film wound to form a plurality of revolutions and capable of being unwound from the film roll to be used in the laminate treatment, and a holding means for holding the laminate film rolls. Further, the feeding means may comprise rollers for feeding the laminate films unwound from the laminate film containing means to the sandwiching means.

With the arrangement as mentioned above, since the laminate film containing means and the feeding means are formed as the unit removably mounted on the apparatus, it is possible to easily load new laminate films into the laminating apparatus merely by replacing the unit with a new one, or by dismounting the unit and by replenishing new films in the unit. Thus, since the replacement and replenishment of the laminate film can easily be effected in a short time without any expert skill, the efficiency of the laminating apparatus can be improved.

Further, another object of the present invention is to facilitate the loading of the laminate films into the laminating apparatus during the replacement and replenishment of the laminate film.

In order to achieve the above object, the present invention provides a laminating apparatus for performing a laminate treatment by encapsuling a laminate object with laminate films, comprising first and second body frames which are releasably interconnected and which can be divided along a feeding surface (as a reference surface) along which the laminate object is fed, and a cutter means comprising two cutter members cooperating with each other to cut the laminate-treated laminate films, one of the cutter members being disposed in the first body frame and the other being disposed in the second body frame.

With this arrangement, during the replacement and replenishment of the laminate film, by dividing or separating the first and second body frames from each other, the two cutter members of the cutter means can be separated from each other to permit the setting of the laminate films therebetween without fail, thereby facilitating the loading operation and reducing the service time. Consequently, the efficiency of the laminating apparatus can be improved.

Incidentally, when the first and second body frames are pivotally connected to each other at their ends, the operability will further be improved.

BRIEF DESCRIPTION OF THE DRAWINGS

FIG. 4 is an elevational sectional view of a laminate film roll unit;

FIG. 5 is a development view showing a drive system of the laminating apparatus;

FIG. 7 is a flowchart for explaining the temperature control of pre-heaters and laminate heaters;

DETAILED DESCRIPTION OF THE PREFERRED EMBODIMENTS

The present invention will now be explained in connection with embodiments thereof with reference to the accompanying drawings.

Figure 1:
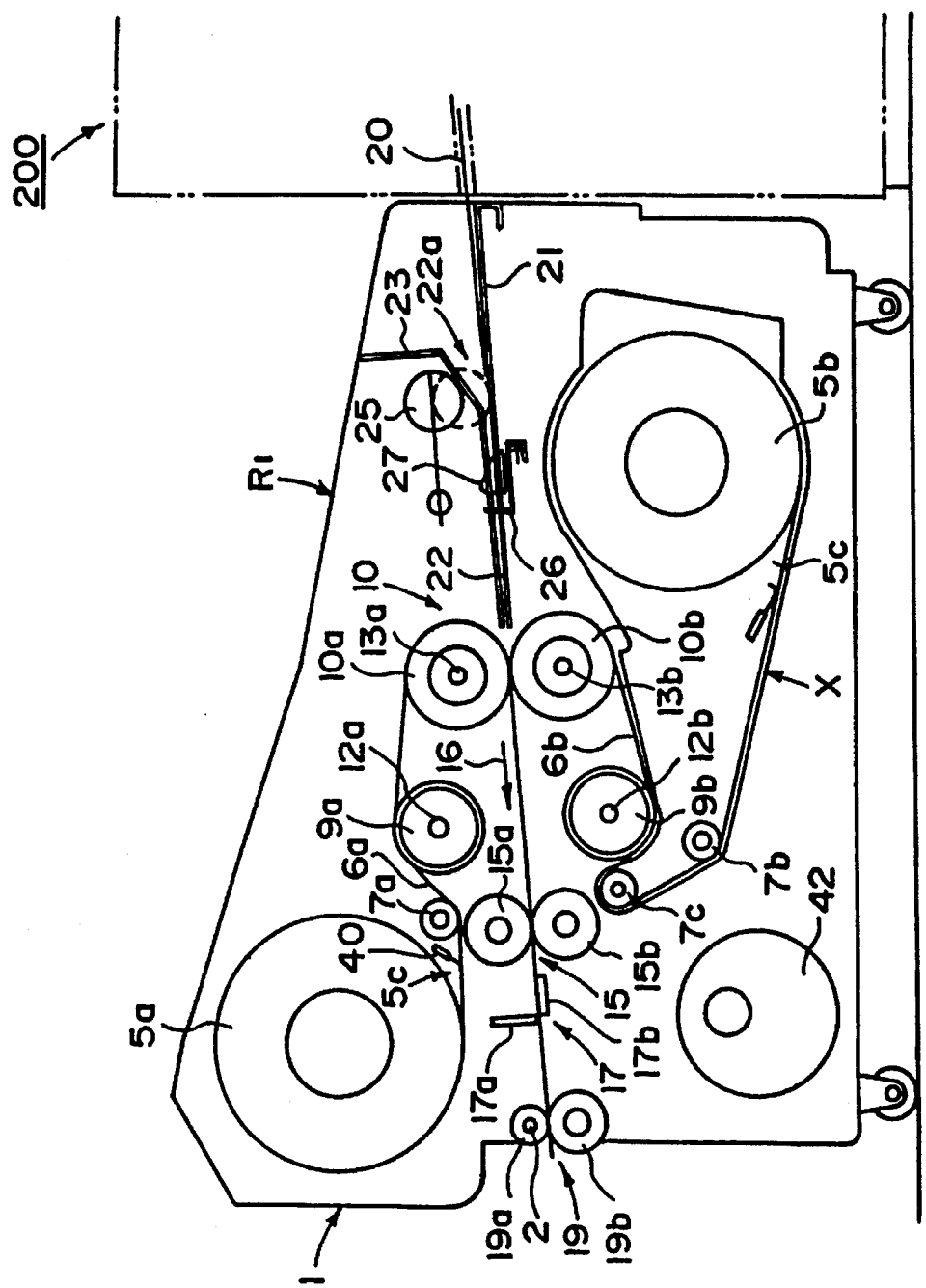
FIG. 1 is an elevational sectional view of a laminating apparatus according to a preferred embodiment of the present invention.
Figure 2A:
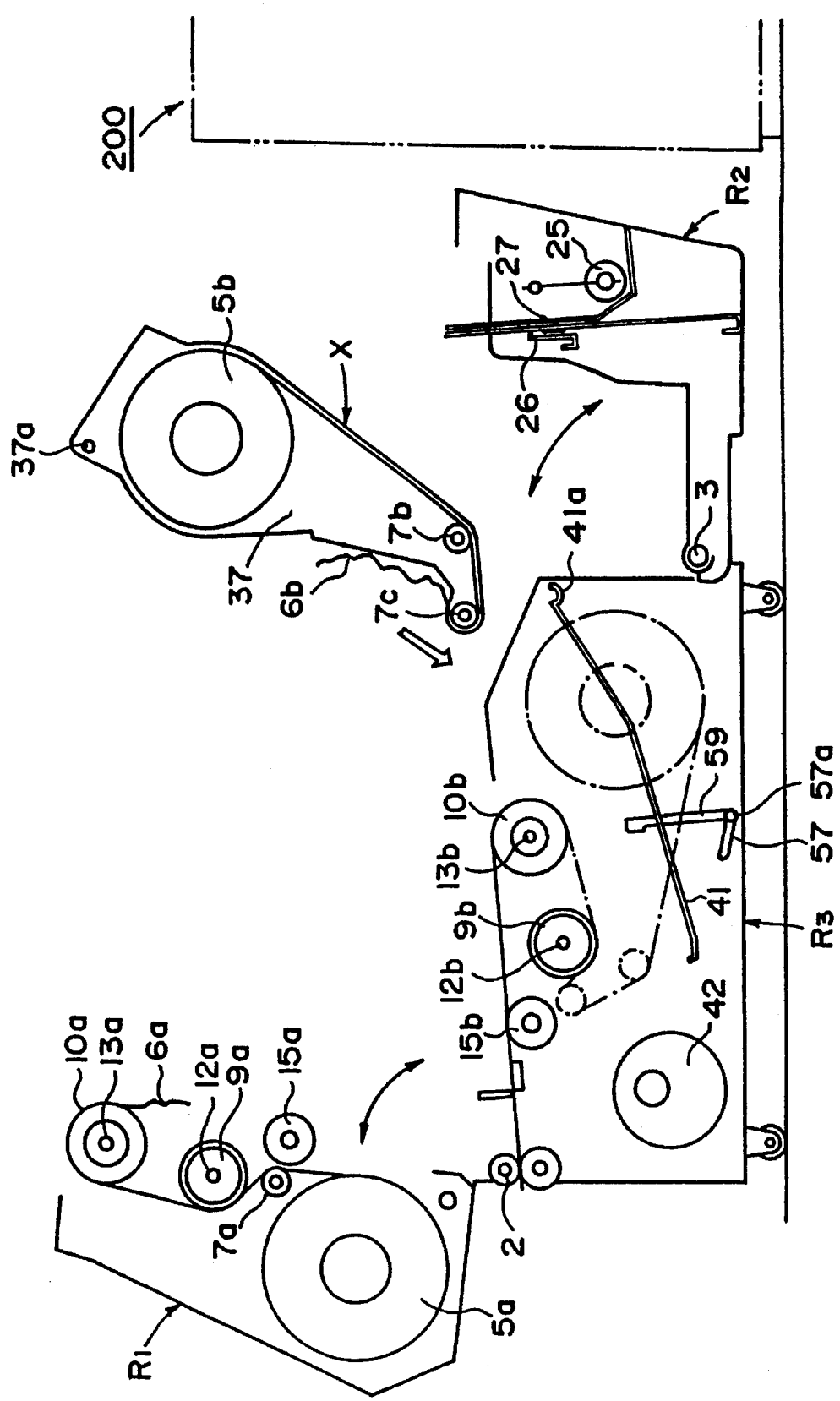
FIG. 2A is an elevational sectional view of the laminating apparatus showing a condition that an upper laminating portion and an upper laminate object supplying portion are opened when laminate films are loaded.
Figure 2B:
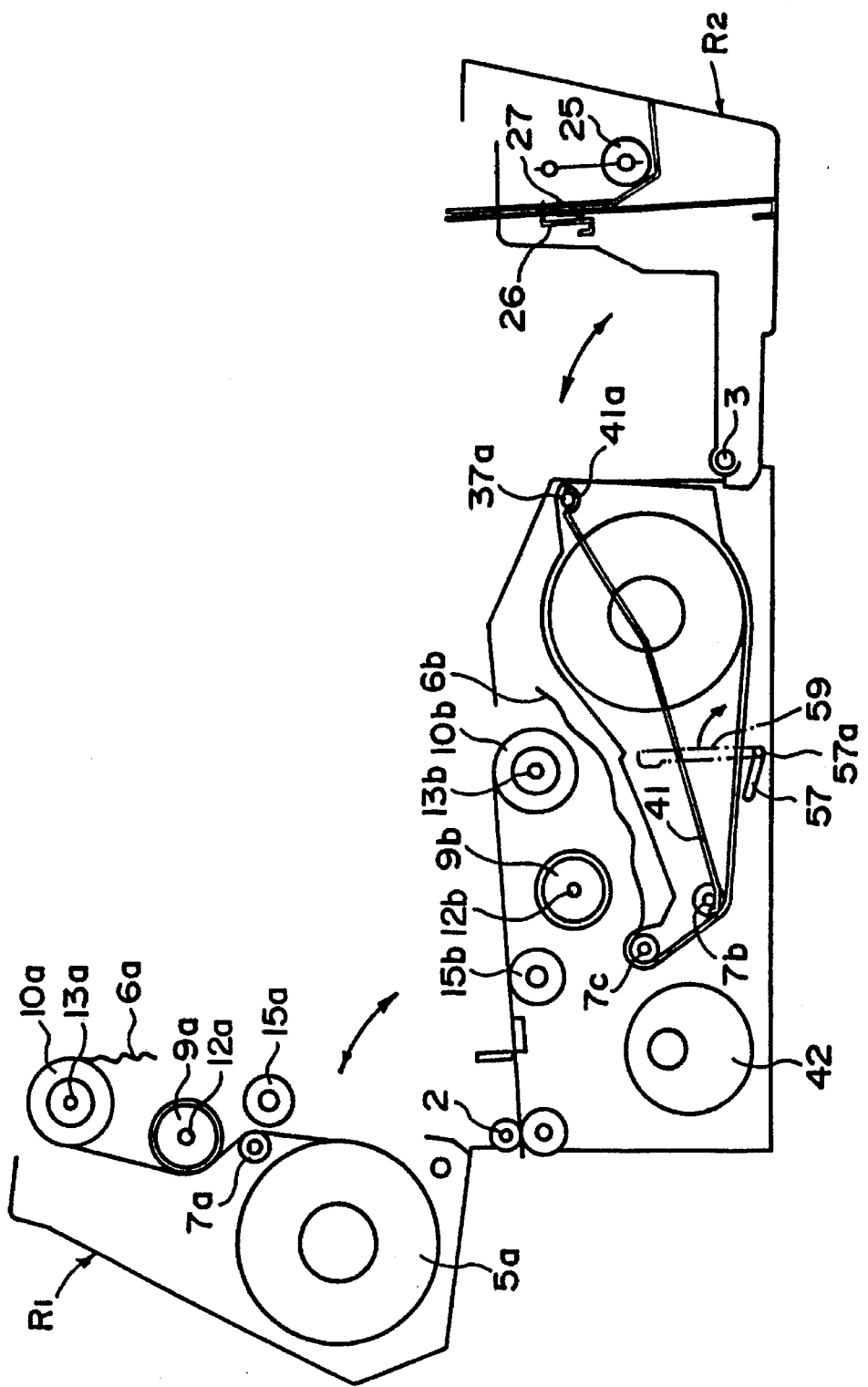
FIGS. 2B and 2C are elevational sectional views of the laminating apparatus.
Figure 2C:
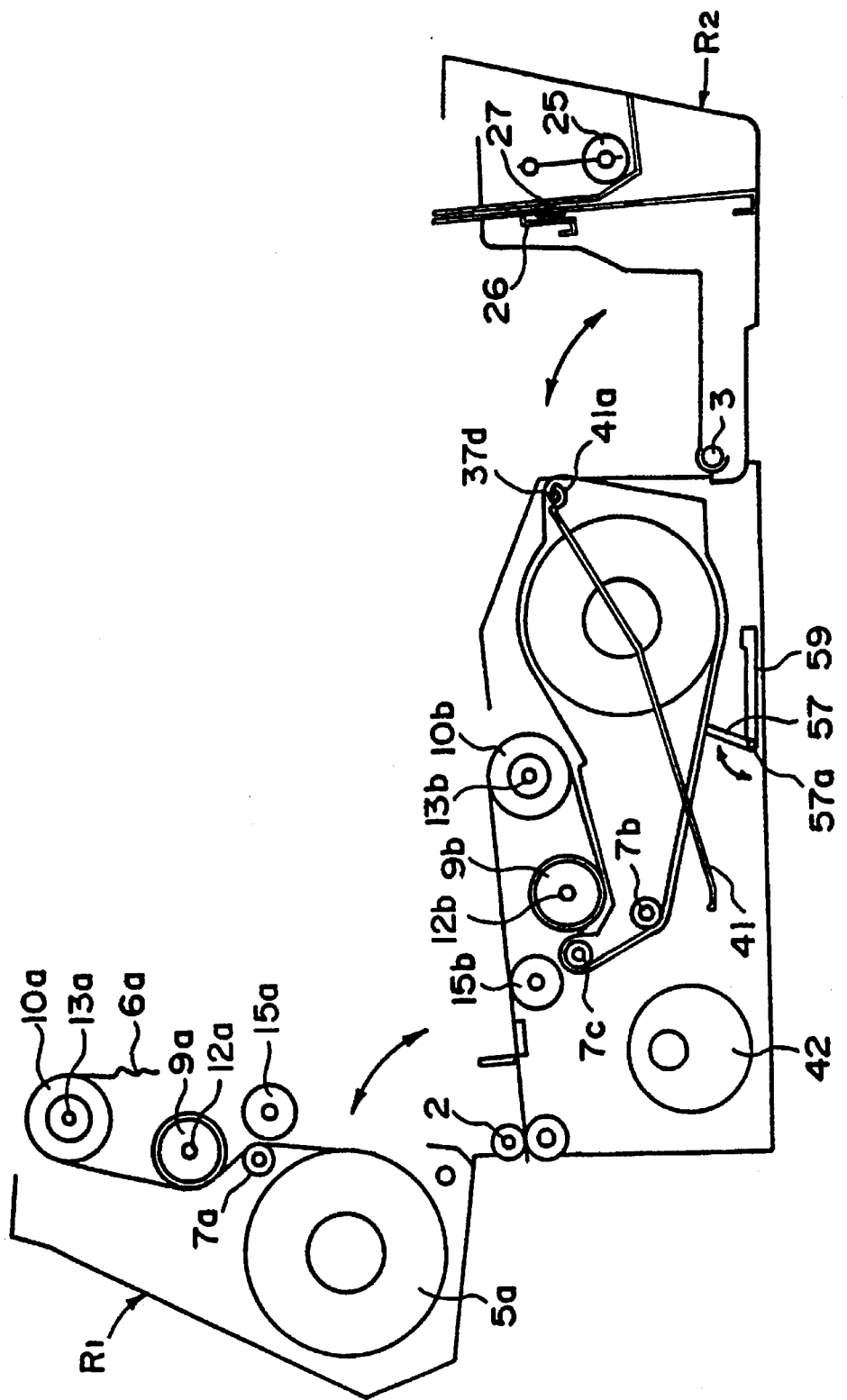

In FIGS. 1 and 2A to 2C, a laminate apparatus 1 comprises a lower body frame $R_3$, an upper laminating portion $R_1$ pivotally connected to the lower body frame $R_3$ via a support shaft 2, and a laminate object supplying portion $R_2$ pivotally mounted on the lower body frame $R_3$ via a support shaft 3, as shown in FIGS. 2A to 2C.

The laminating portion $R_1$ includes a laminate film roll 5a of a laminate film 6a. The laminate film 6a unwound from the laminate film roll 5a passes around a tension roller 7a and a pre-heat roller 9a and is wound around a pressure and heat roller 10a. On the other hand, the lower body frame $R_3$ includes a laminate film roll 5b of a laminate film 6b. The laminate film 6b unwound from the laminate film roll 6a passes around tension rollers 7b, 7c and a pre-heat roller 9b and is wound around a pressure and heat roller 10b which is urged against the pressure and heat roller 10a.

The tension rollers 7a, 7c act as film holding rollers which serve to cause the laminate films 6a, 6b to contact the respective pre-heat rollers 9a, 9b with a given length and serve to prevent the slack of the films 6a, 6b between the pre-heat rollers 9a, 9b and the pressure and heat rollers 10a, 10b and to prevent the films from adhering to each other due to slack in the films. Further, the laminate film roll 5b and tension rollers 7b, 7c and the like comprise a laminate film roll unit X which is removably mounted on the apparatus 1.

Figure 6:
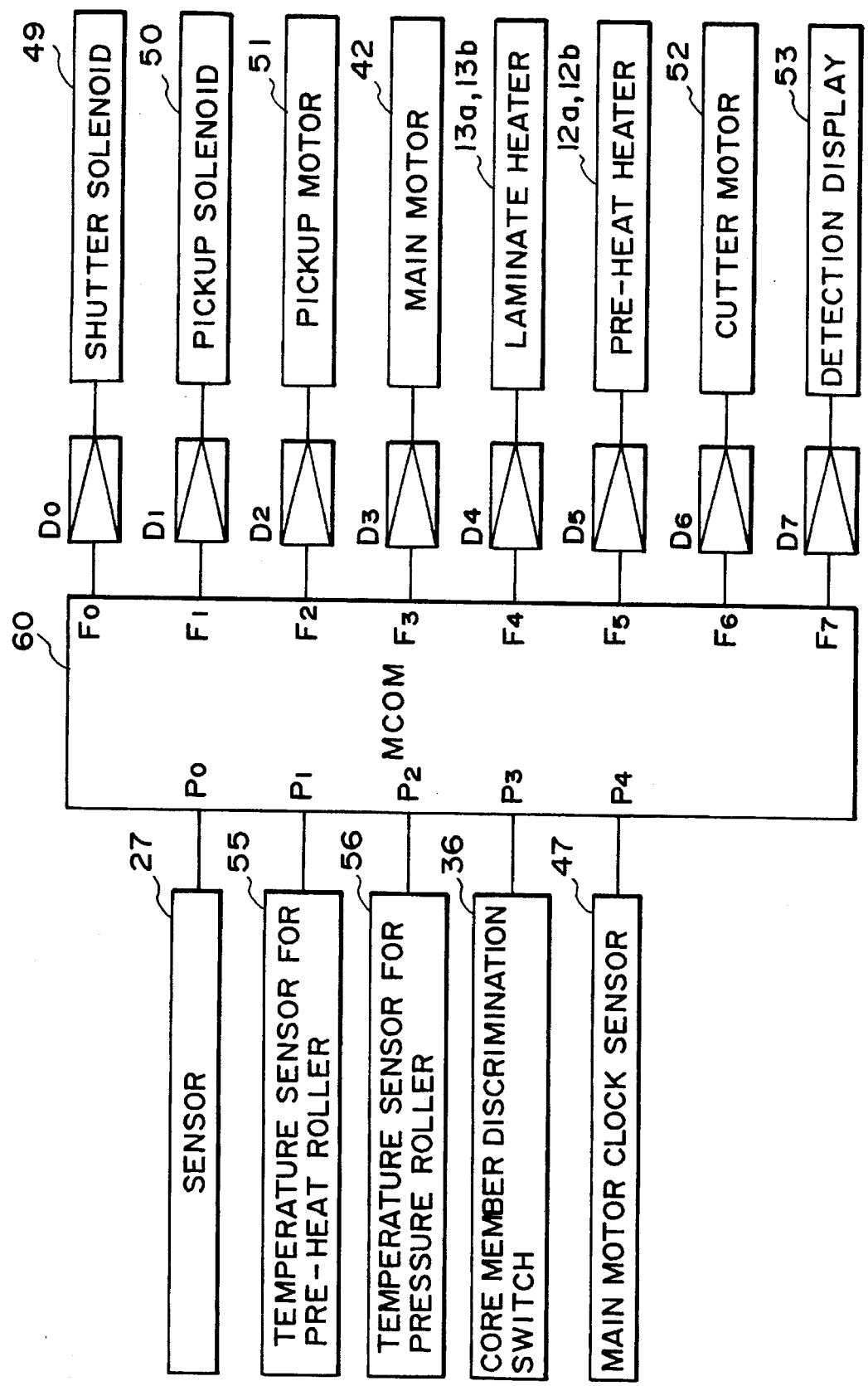
FIG. 6 is a block diagram of a control system of the laminating apparatus according to the present invention.

The pre-heat rollers 9a, 9b incorporate, at their central portions, pre-heaters 12a, 12b for heating these rollers, respectively, and the pressure and heat rollers 10a, 10b incorporate, at their central portions, laminate heaters 13a, 13b for heating these rollers, respectively. The surface temperatures of the pre-heat rollers 9a, 9b are detected by temperature sensors 55 for pre-heat roller as shown in FIG. 6, and the surface temperatures of the paired pressure and heat rollers 10a, 10b are detected by temperature sensors 56 for pressure roller.

At a downstream side of the paired pressure and heat rollers 10, a pair of pull rollers 15 comprising an upper roller 15a and a lower roller 15b, which is urged against the upper roller, are disposed, so that they can pull the laminate films 6a, 6b joined at the pressure and heat roller pair 10 and a laminate object (described later) toward a direction shown by the arrow 16. At a downstream side of the pull roller pair 15, there are disposed a cutter unit 17 and ejector rollers 19 comprising an upper roller 19a and a lower roller 19b in order. The cutter unit 17 comprises a cutter 17a and a die 17b and serves to cut trailing end portions of the laminate films 6a, 6b.

At an upstream side of the pressure and heat roller pair 10, there are disposed a platform 21 on which the laminate object 20 is set or rested, and an upper guide plate 23 cooperating with the platform to define a feeding path 22. At an introduction opening 22a of the feeding path 22, there are disposed a pick-up roller 25 which can be urged against and separated from the platform 21, and a shutter member 26 for regulating a leading end of the laminate object 20 to be inserted. Further, a sensor 27 for detecting the inserted laminate object 20 is arranged between the pick-up roller 25 and the shutter member 26.

Next, a load applied to the laminate films 6a, 6b in the pulling direction (direction shown by the arrow 16) will be explained with reference to FIGS. 3A and 3B.

Figure 3A:
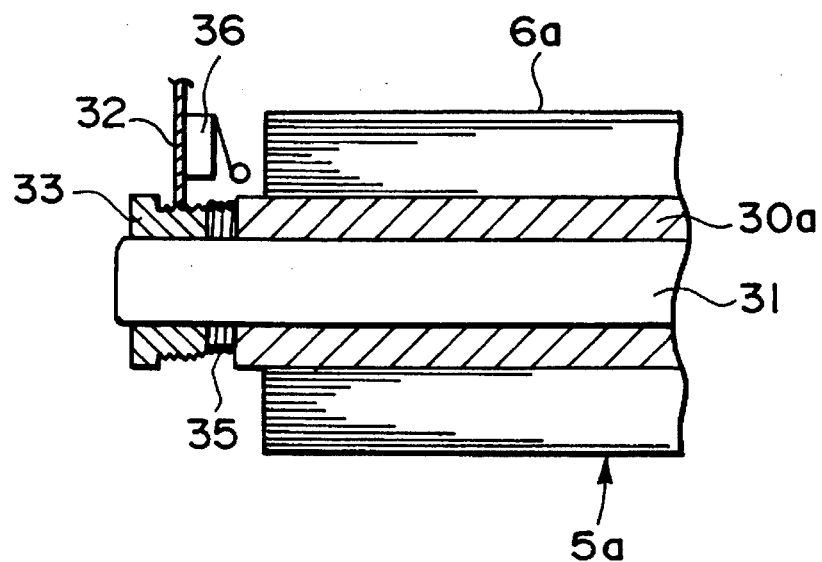
FIGS. 3A and 3B are sectional views of main portions of laminate film rolls.
Figure 3B:
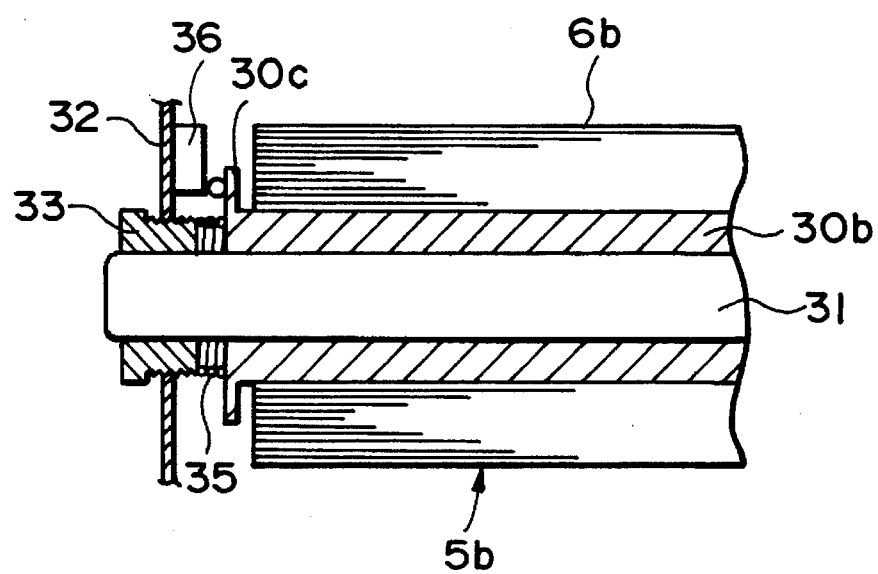

In FIG. 3A, the laminate film 6a is wound around a metal core 30a to form the laminate film roll 5a. A roll shaft 31 on which the metal core 30a is rotatably mounted is supported by a side plate 32 of the laminating apparatus via a tension adjusting nut 33 threaded into the side plate. A tension spring 35 disposed between the metal core 30a and the tension adjusting nut 33 serves to adjust a load on the laminate film roll 5a in the film pulling direction on the basis of the tightness of the tension adjusting nut 33.

The laminate film roll 5a is constituted by the laminate film 6a having a first thickness. The laminate film roll 5b shown in FIG. 3B is comprises a laminate film 6b having a second thickness and wound on a metal core 30b. Although the metal core 30a has no flange, the metal core 30b is provided at one end with a flange 30c. Microswitches 36 secured to the side plate 32 near the respective cores serve to discriminate the cores. When the first core 30a is mounted on the side plates, the microswitch is turned OFF, whereas, when the second core 30b is mounted, the microswitch is turned ON by contacting the flange 30c. In this 10 way, it is possible to discriminate the core 30a from the core 30b.

Next, the mounting of the laminate film roll unit X onto the laminating apparatus will be explained with reference to FIGS. 2A to 2C and FIG. 4.

The above-mentioned laminate film roll 5b is mounted within a frame 37. The laminate film 6b is separated from the laminate film roll 5b at a separation point 5c (see FIG. 1 of the roll and is directed toward the upper portion of the laminate film roll unit X through the tension rollers 7b, 7c.

In the above condition, as shown in FIGS. 2A to 2C, the laminate film roll unit X is inserted into the lower body frame $R_3$ from the above while the upper laminating portion $R_1$ and the laminate object supplying portion $R_2$ are opened. As shown in FIG. 2B, by advancing the tension roller 7b of the laminate film roll unit X along a rail 41 disposed within the lower body frame $R_3$, the laminate film roll unit X is inserted into the lower body frame $R_3$.

In this case, the positioning of the laminate film roll unit X within the lower body frame $R_3$ is accomplished by fitting a positioning shaft 37a formed on the laminate film roll unit X into a bearing recess 41a formed in a rear end of the rail 41 as shown in FIG. 2B.

In FIG. 2B, a positioning lever 57 which is rotatably supported within the lower body frame $R_3$ via a support shaft 57a, can be rotated by an operation lever 59 integrally formed with the positioning lever 57. As shown in FIG. 2B, after the laminate film roll unit X is positioned in the lower body frame $R_3$, by rotating the operation lever 59 in a direction shown by the arrow, the positioning lever 57 is rotated in the same direction, thus lifting the laminate film roll unit X, with the result that, as shown in FIG. 2C, the unwound laminate film 6b can easily be urged against the pre-heat roller 9b and the pressure and heat roller 10b and be tensioned, thereby finishing the loading of the laminate film 6b.

Next, a drive system for the laminating apparatus will be explained with reference to FIG. 5.

In FIG. 5, a main motor 42 is fixedly mounted on the side plate 32 via an attachment member (not shown) and has an output shaft on which a motor gear 43 and a clock disc 45 are fixedly mounted. A pull roller gear 46 secured to one end of a roller shaft of the upper roller 15a of the pull roller pair 15 is meshed with the motor gear 43. The clock disc 45 has a plurality of slits (not shown), and a clock sensor 47 consisting of an optical sensor of a permeable type for detecting the slit is disposed near the clock disc 45.

Next, the laminate treatment of the laminate object 20 will be explained with reference to FIGS. 1 and 6.

The laminate object 20 is rested on the platform 21 (FIG. 1) and inserted into the introduction opening 22a until the leading end of the laminate object abuts against the shutter member 26. When the laminate object 20 is detected by the sensor 27, a shutter solenoid 49 (FIG. 6) is turned ON, thus retracting the shutter member 26 from the platform 21. At the same time, a pick-up solenoid 50 is turned ON, thus lowering the pick-up roller 25 to urge the laminate object 20 against the platform 21 with a predetermined pressure.

Thereafter, a pick-up motor 51 is turned ON to rotate the pick-up roller 25. The laminate object 20 is fed by the rotation of the pick-up roller 25. After a predetermined time period has elapsed, the main motor 42 is turned ON, thus starting the pull roller pair 15 to rotate. The laminate films 6a, 6b are pulled by the pull roller pair 15, and the pressure and heat roller pair 10 and the pre-heat rollers 9a, 9b are rotatingly driven by the movement of the pulled laminate films. The laminate films 6a, 6b which are not adhered to each other are heated to a first temperature by means of the previously heated pre-heat rollers 9a, 9b, and then are heated to a second temperature (controlled to always have a constant value) by means of the pressure and heat roller pair 10.

The laminate object 20 is fed to a nip between the pressure and heat rollers 10a, 10b by the pick-up roller 25 and is sandwiched between upper and lower laminate films 6a, 6b. In this condition, the laminate object 20 together with the laminate films are laminate-treated by being pressurized and heated by the pressure and heat rollers 10a, 10b. After the pick-up roller 25 is rotated for a predetermined time period, the pick-up solenoid 50 is activated to retract the pick-up roller from the platform 21, and, when the pick-up motor 51 is turned OFF, the pick-up roller 25 is stopped.

When the trailing end of the laminate object 20 is detected by the sensor 27, the number of slits of the clock disc 45 is counted by the clock sensor 47. After a distance between the sensor 27 and the cutter unit 17 is calculated, the main motor 42 is turned OFF, thus stopping the feeding of the laminate-treated laminate object 20. At the same time, a cutter motor 52 is turned ON, whereby the trailing ends of the laminate films 6a, 6b which are sealingly sandwiching the laminate object 20 are cut by the cutter 17a. The completed laminate sheet is ejected by the ejector rollers 19 onto an ejector tray (not shown).

By repeating the above-mentioned sequences, one or more laminate objects 20 may be successively laminate-treated.

Next, the control and operation of the laminating apparatus will be described with reference to a block diagram shown in FIG. 6.

In FIG. 6, the control circuit comprises a well-known one-chip microcomputer 60 (referred to as "MCOM" hereinafter) including ROM, RAM and the like. Input ports $P_0$–$P_4$ of the MCOM 60 receive input signals from the sensor 27 for detecting the presence/absence of the pick-up roller 25 on the platform 21, the pre-heat roller temperature sensors 55 comprising a thermistor for measuring the surface temperatures of the pre-heat rollers 9a, 9b, the pressure and heat roller temperature sensors 56 for measuring the surface temperatures of the pressure 1 and heat rollers 10a, 10b, the metal core discrimination switches 36 for discriminating the kind of the metal cores 30a, 30b relating to the laminate films 6a, 6b to discriminate the thickness of the laminate films 6a, 6b, and the clock sensor 47 for counting the rotational amount of the main motor 42 and the shifting amounts of the peripheral surfaces of the pull roller pair 15.

Output ports $F_0$–$F_7$ of the MCOM 60, output signals regarding the ON/OFF operation of the shutter member 26, ON/OFF operation of the pick-up solenoid 50 for shifting the pick-up roller 25 from the retracted position onto the laminate object 20 and for urging the pick-up roller 25 against the laminate object 20 with a predetermined pressure, ON/OFF operation of the pick-up motor 51 for rotating the pick-up roller 25, ON/OFF operation of the laminate heaters 13a, 13b for heating the laminate films 6a, 6b, ON/OFF operation of the pre-heaters 12a, 12b for maintaining the surface temperatures of the pre-heated rollers 9a, 9b at a constant value, ON/OFF operation of the cutter motor 52 for performing the cutting operation for separating the laminate-treated laminate sheet from the continuous laminate films 6a, 6b, and a detection display 53 for informing the operator that the next laminate object 20 can be inserted or the next laminate treatment can be performed.

The reading of the input signals or ON/OFF of the loads, and the controls to the various set values are carried out on the basis of the program stored in the ROM of the MCOM 60.

Next, the control of the surface temperatures of the pre-heat rollers 9a, 9b and the pressure and heat rollers 10a, 10b will be explained with reference to a flowchart shown in FIG. 7.

In FIG. 7, when a main switch SW is depressed (step S201), the surface temperatures of the pressure and heat rollers 10a, 10b are detected by the temperature sensors 56 and these temperatures are compared with predetermined temperatures (step S202), If the temperatures are lower than the predetermined temperatures, the laminate heaters 13a, 13b are turned ON (step S203) until the predetermined temperatures are attained.

Next, the surface temperatures of the pre-heat rollers 9a, 9b are detected by the pre-heater temperature sensors 55 and these temperatures are compared with predetermined aimed temperatures (step S204). The predetermined temperatures are determined in accordance with the thickness of the laminate films on the basis of the information from the metal core discrimination switches 36. If the pre-heat temperatures are lower than the predetermined temperatures, the pre-heaters 12a, 12b are activated (step S205) to heat the pre-heaters up to their predetermined temperatures and then are deactivated. In this way, the temperature control of the pre-heaters 9a, 9b and the pressure and heat rollers 10a, 10b is completed.

Then, it is checked whether the laminate object 20 exists in the feeding path 22 of the platform 21 on the basis of the information from the sensor 27. If the laminate object 20 is absent, the temperature adjustment is effected again. On the other hand, if the laminate object 20 is present, only the temperature control of the pressure and heat rollers 10a, 10b is effected (steps S207, S208).

It is judged whether the laminate (operation) is finished or not on the basis from the information of the sensor 27 regarding the trailing end of the laminate object 20 (step S209). If the laminate object 20 is present, the temperature control of the pressure and heat rollers 10a, 10b is effected (steps S207, S208) whereas, if the laminate object is absent, the temperature adjustment of the present and heat roller pair 10 and the pre-heat rollers 9a, 9b is effected again (steps S202, S204).

In the illustrated embodiment, while an example that the lower laminate film roll 5b comprises a removable film roll unit X was explained, a second embodiment of the present invention wherein the upper laminate film roll 5a comprises a removable film roll unit will now be explained with reference to FIGS. 8 and 9.

An upper laminate film roll unit is designated by Y and comprises a frame 71, the roll shaft 31 mounted on the frame 71, the metal core 30a which is rotatably mounted around the roll shaft 31 and on which the laminate film roll 5a is mounted, the tension roller 7a for tensioning the laminate film 6a unwound from the laminate film roll 5a and the like. As shown in FIG. 9, the laminate film 6a unwound from the laminate film roll 5a is directed below a thermal insulator 73 disposed on a lower portion of the frame 71 through the tension roller 7a.

Figure 8:
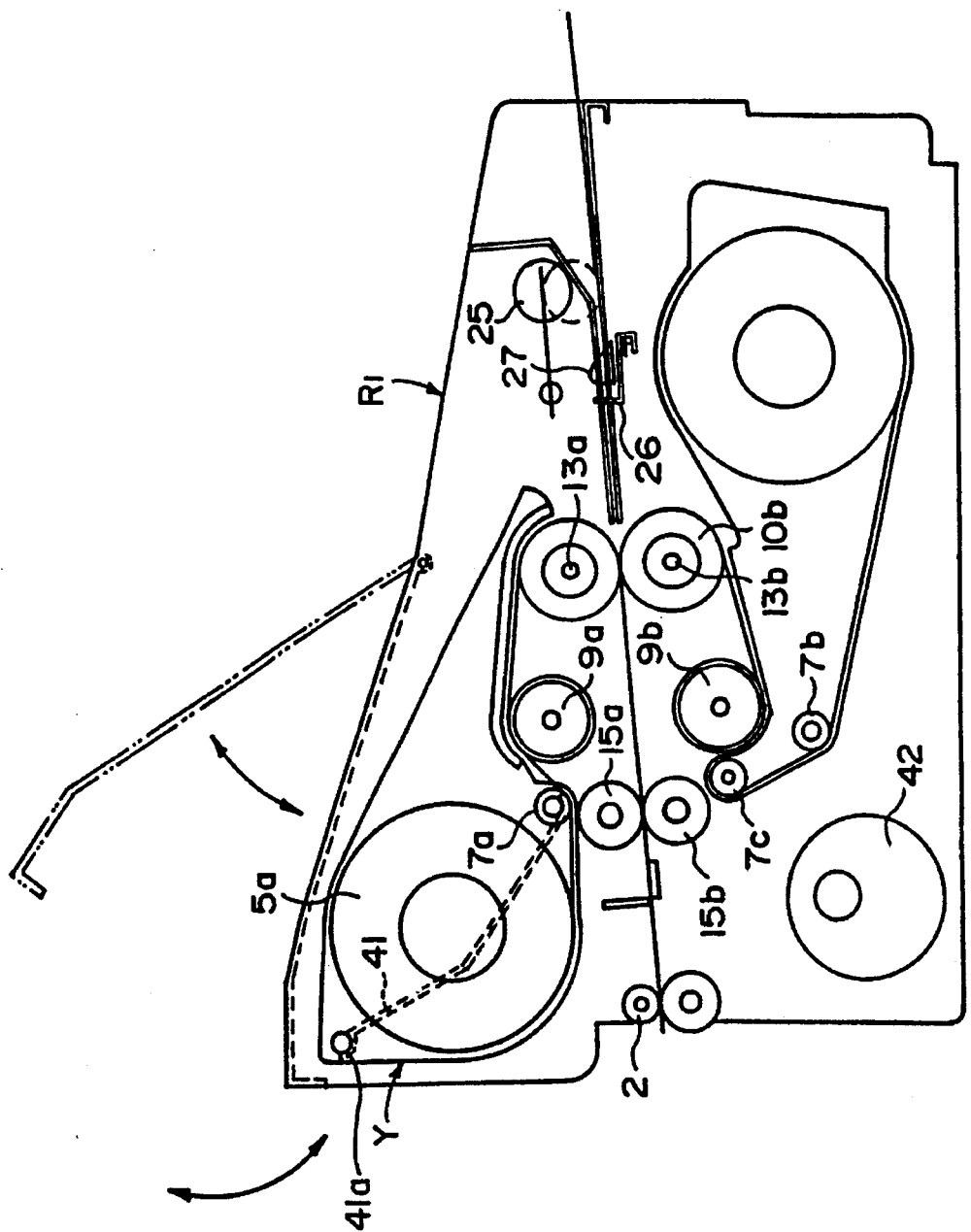
FIG. 8 is an elevational sectional view of a laminating apparatus according to a second embodiment of the present invention.
Figure 9:
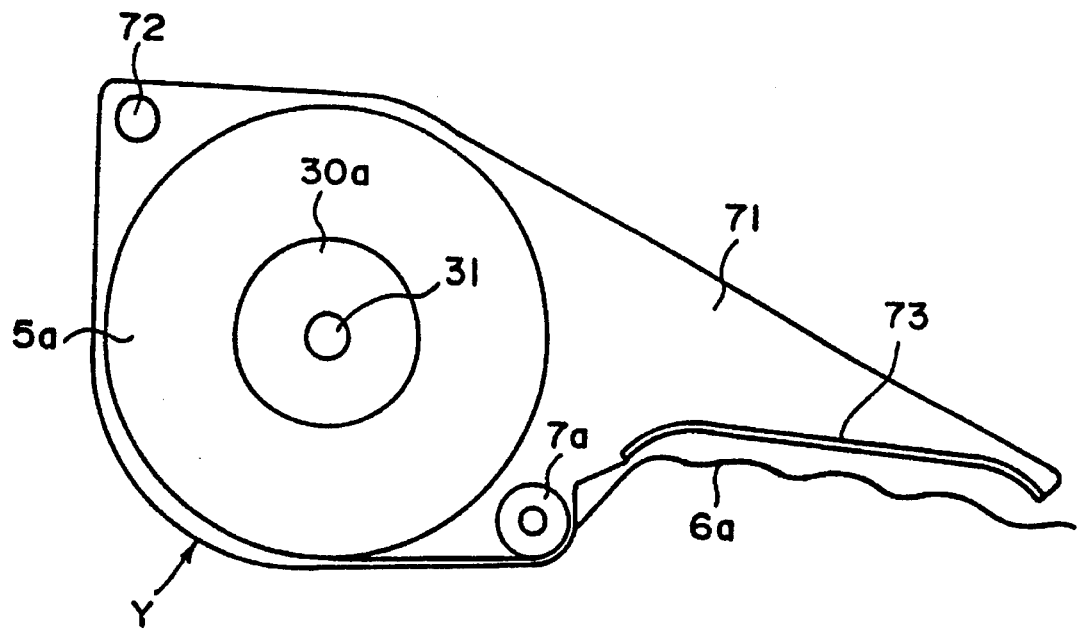
FIG. 9 is an elevational sectional view of an upper laminate film roll unit.

In this condition, the laminate film roll unit Y is mounted within an upper body frame $R_1$, as shown in FIG. 8. The laminate film roll unit Y is positioned in place by fitting a positioning shaft 72 formed on the frame 71 into a bearing recess 41a. By forming the laminate film roll unit Y in this way, the replacement of the laminate film roll 5a with respect to the frame 71 removed from the upper body frame $R_1$ can easily be performed, and, further, the laminate film 6a separated or unwound from the laminate film roll 5a can be previously wound around the tension roller 7a to be tensioned. Thus, since the replacement of the laminate film roll 5a with respect to the body frame $R_1$ can be performed in a condition that the laminate film roll unit Y dismounted, the replacement operation of the laminate film roll 5a can easily be performed in a short time.

Incidentally, in the mounting and dismounting of the laminate film roll unit Y regarding the laminating apparatus, the unit is guided and positioned by a rail 41 in the similar manner to the first embodiment.

Figure 10:
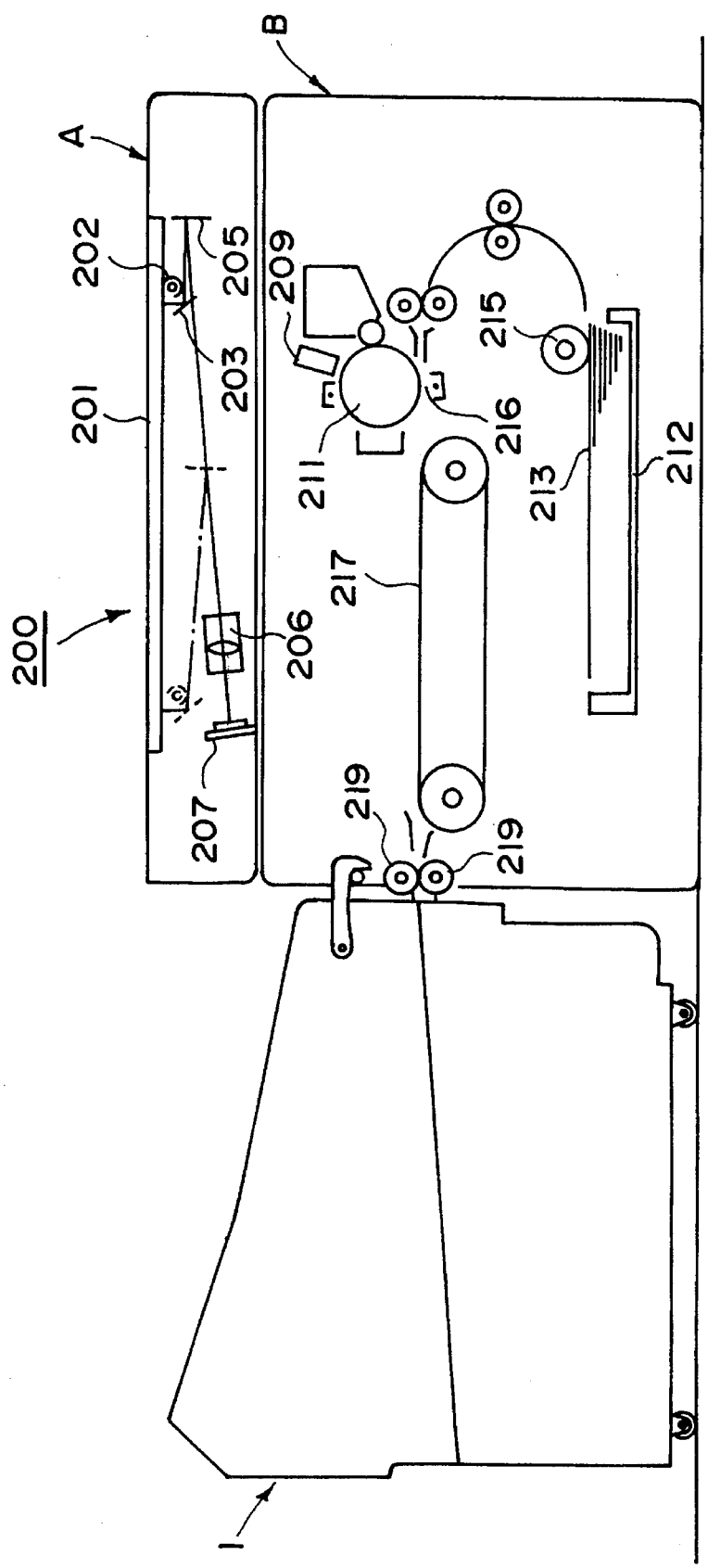
FIG. 10 is an elevational sectional view of an image forming system to which the laminating apparatus is connected.

FIG. 10 shows an image forming system to which the above-mentioned laminating apparatus is connected.

In FIG. 10, in a reader designated by A, an original rested on a platen glass 201 is illuminated by light from an illumination lamp 202, and the reflected light from the original is reflected by mirrors 203, 205 to pass through a focusing lens 206 by which an image is focused on a CCD 207, thus reading the original. The image information read by the reader A is sent to a printer B, where a latent image is formed on a photosensitive drum 211 by a scanner 209 on the basis of the image information.

Sheets 213 in a sheet supply cassette 212 disposed within the printer B are fed one by one to the photosensitive drum 211 by means of a sheet supply roller 215, and the image on the photosensitive drum 211 is transferred onto the sheet at a transfer station 216. The sheet 213 on which the image was transferred is introduced into the laminating apparatus by means of a conveying belt 217 and ejector rollers 219.

Incidentally, when the laminate film roll unit X is mounted on or dismounted from the laminating apparatus, as shown in FIGS. 2A to 2C, the laminating apparatus may be shifted away from the image forming system and then the portions $R_1$ and $R_2$ may be opened.

Next, a third embodiment of the present invention will be explained with reference to FIGS. 11 and 12. Incidentally, the same parts or elements as those in the previous embodiments are designated by the same reference numerals and the explanation thereof will be omitted.

Figure 11:
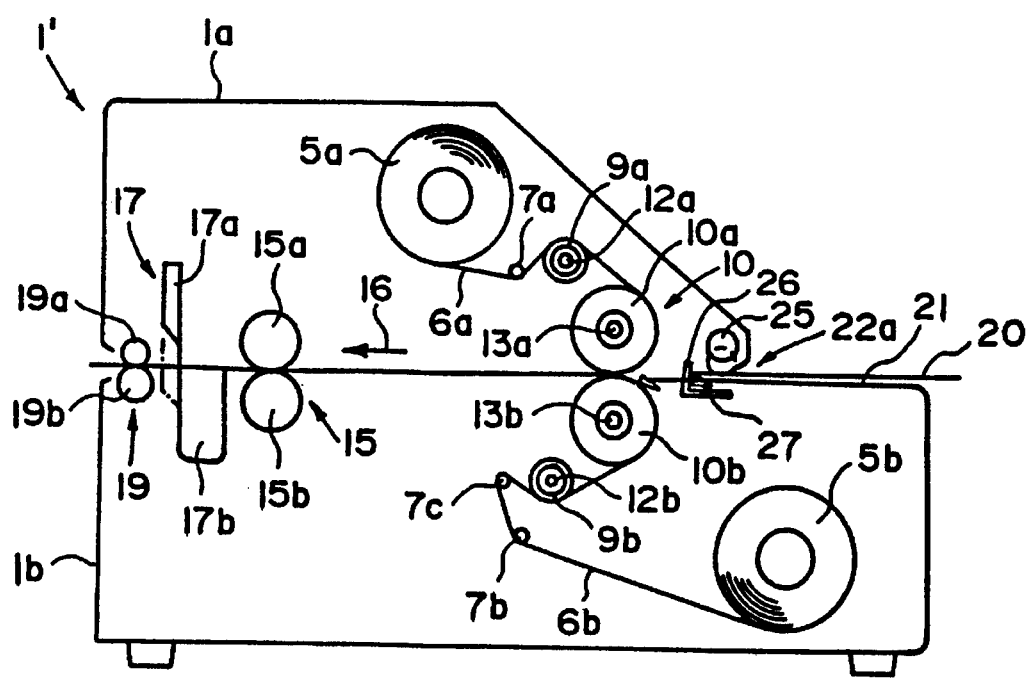
FIG. 11 is an elevational sectional view of a laminating apparatus according to a third embodiment of the present invention.
Figure 12:
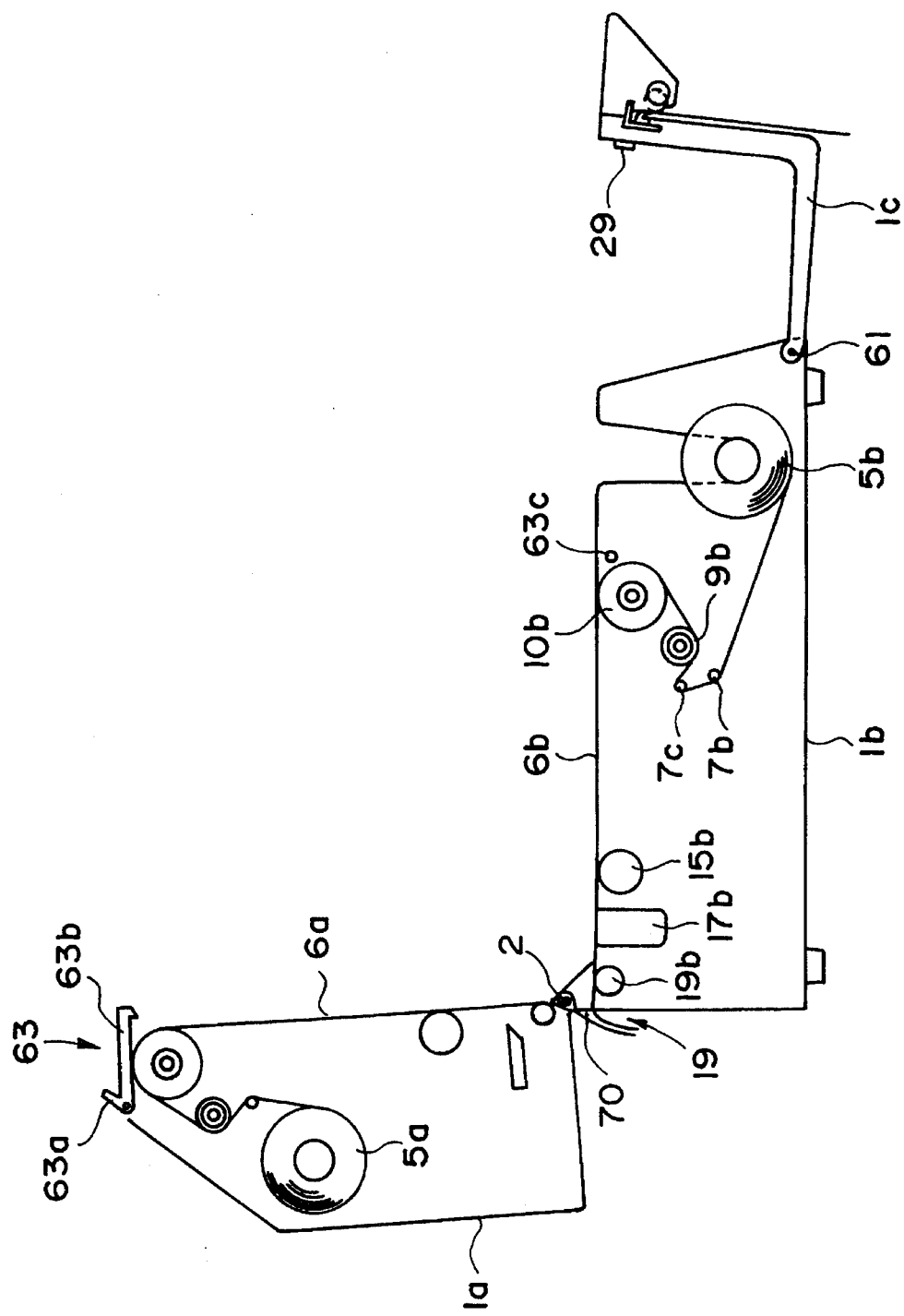
FIG. 12 is an elevational sectional view of the laminating apparatus showing a condition that an upper laminating portion and an upper laminate object supplying portion are opened when laminate films are loaded.

As shown in FIG. 11, a laminating apparatus 1' comprises a lower frame (second support member) 1b, and an upper frame (first support member) 1a rotatably mounted on one end of the lower frame 1b via a support shaft 2 (FIG. 12).

The upper frame 1a includes an upper laminate film roll 5a, a tension roller 7a, a pre-heat roller 9a, a pressure and heat roller 10a, a pull roller 15a, a cutter (upper cutter blade) 17a of a cutter unit 17 and the like. On the other hand, the lower frame 1b includes a lower laminate film roll 5b, tension rollers 7b, 7c, a pressure and heat roller 10b, a pull roller 15b, a die (lower cutter blade) 17b of the cutter unit 17 and the like.

As shown in FIG. 12, the upper frame 1a is provided with a gripper 63a and a hook 63b integrally formed with the gripper, wherein elements 63a, 63b are pivotally mounted on the upper frame 1a. The lower frame 101b is provided with a fixed shaft 63c to which the hook 63b can be locked. The gripper 63a, hook 63b and fixed shaft 63c form a locking mechanism 63 for locking the upper frame 1a to the lower frame 1b. By locking the upper frame 1a to the lower frame 1b by means of the locking mechanism 63 in a closed position of the upper frame, the pressure and heat rollers 10a, 10b, the pull rollers 15a, 15b and the ejector rollers 19a, 19b are urged against each other, respectively, with predetermined pressures. And, the cutter 17a is positioned in a predetermined position with respect to the die 17b.

In FIG. 12, a laminate object supplying portion 1c is rotatably mounted on the lower frame 1b via a support shaft 61 and can be opened as shown to expose the laminate film roll 5b. The laminate object supplying portion 1c can be locked to the lower frame 1b by a magnet 29.

Next, the loading of the laminate films will be explained with reference to FIG. 12.

The lower laminate film roll 5b is set within the lower frame 1b by engaging it with a notched portion of the lower frame. The laminate film 6b unwound from the laminate film roll 5b is passed around upper parts of the tension rollers 7b, 7c and is wound around the pressure and heat roller 10b. Then, the laminate film 6b is passed through the pull roller 15b, die 17b and ejector roller pair 19 and extends through an ejection opening 70.

On the other hand, the laminate film roll 5a is set within the upper frame 1a. The laminate film 6a unwound from the laminate film roll 5a is passed around the tension roller 7a and the pre-heat roller 9a and is wound around the pressure and heat roller 10a. Then, the laminate film 5a is passed through the pull roller 15a, past the cutter unit 17 and ejector roller pair 19 and extends through the ejection opening 70.

The upper frame 1a is urged against the lower frame 1b from the above and is locked to the lower frame 1b with engaging the hook 63b by the fixed shaft 63c. Further, the laminate object supplying portion 1c is closed to secure it to the lower frame 1b, thus completing the loading of the laminate films 6a, 6b.

FIGS. 14A to 16 show the details of the cutter unit 17.

A support plate 171 to which the cutter 17a is secured is pivotally mounted on the upper frame 1a via an upper blade shaft 172. A cutter bearing 75 is received in a bearing recess 173 formed in the lower frame 1b for up-and-down movement and is biased upwardly by means of a cutter lifting spring 76. A cam 77 disposed near the upper blade shaft 172 can receive a driving force from a cutter motor 79 by meshing a gear 77a integrally formed with the cam with a pinion 80 of the cutter motor 79.

Figure 14A:
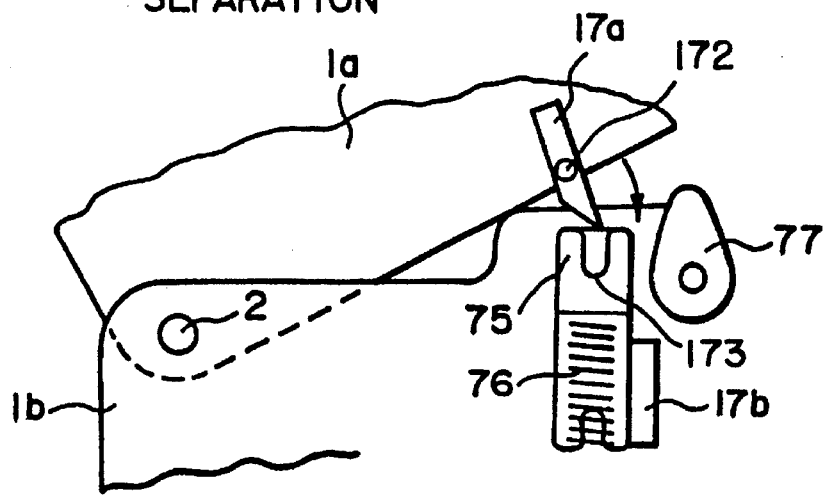
FIGS. 14A to 14C are elevational sectional views showing a cutter means.
Figure 14B:
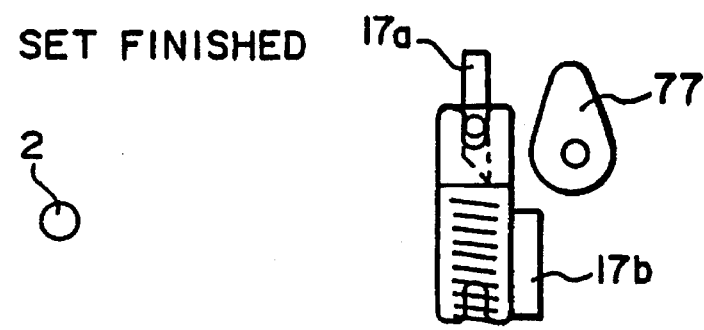
Figure 14C:
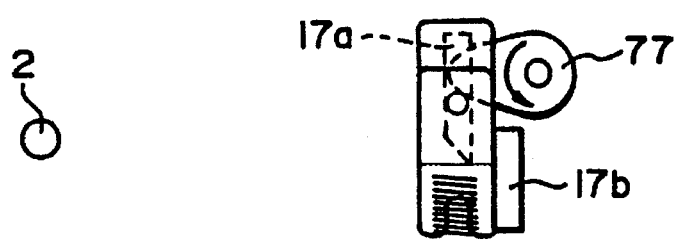
Figure 15:
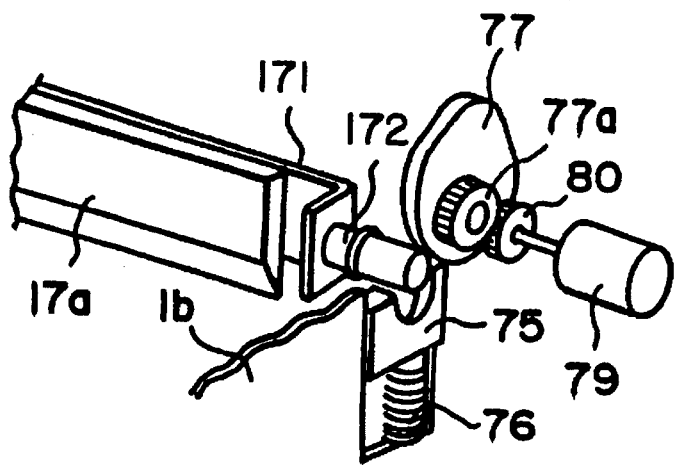
FIG. 15 is a perspective view of the cutter means; 10
Figure 16:
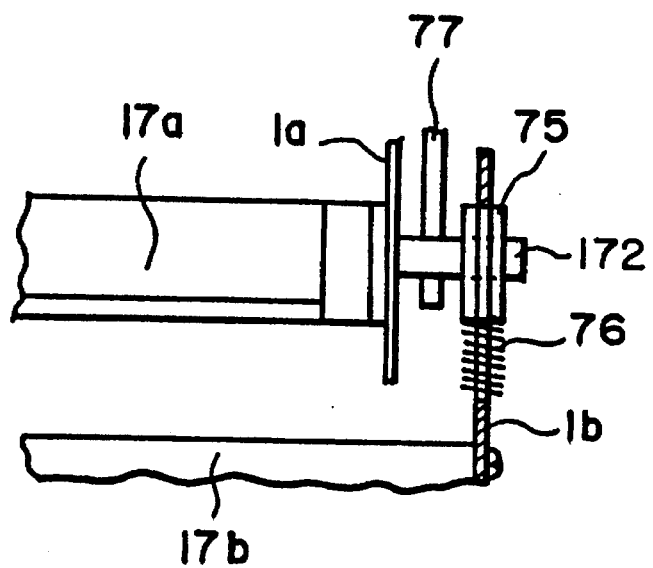
FIG. 16 is a plan view of the cutter means.
Figure 17:
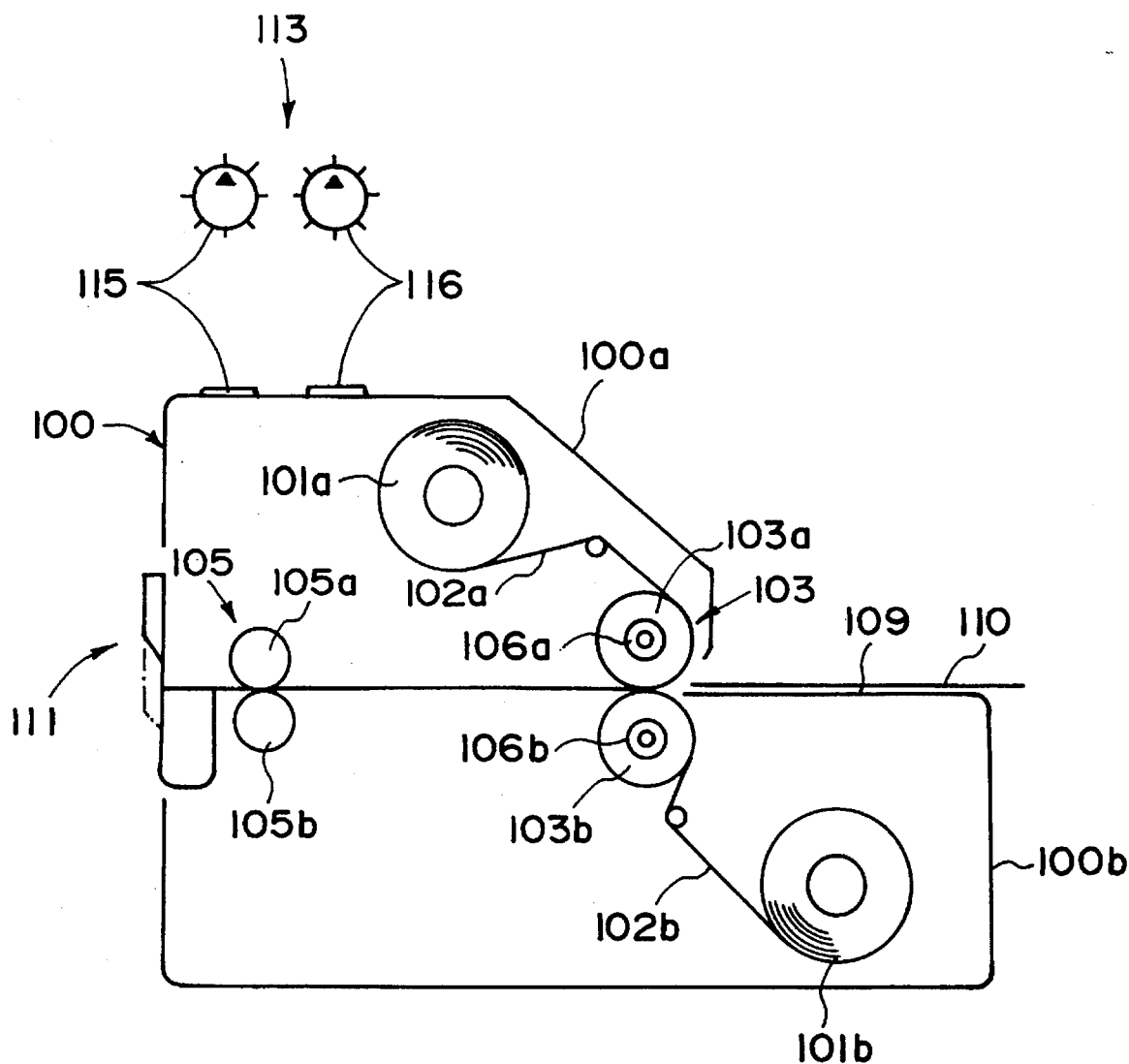
FIG. 17 is an elevational sectional view of a conventional laminating apparatus.
Figure 18:
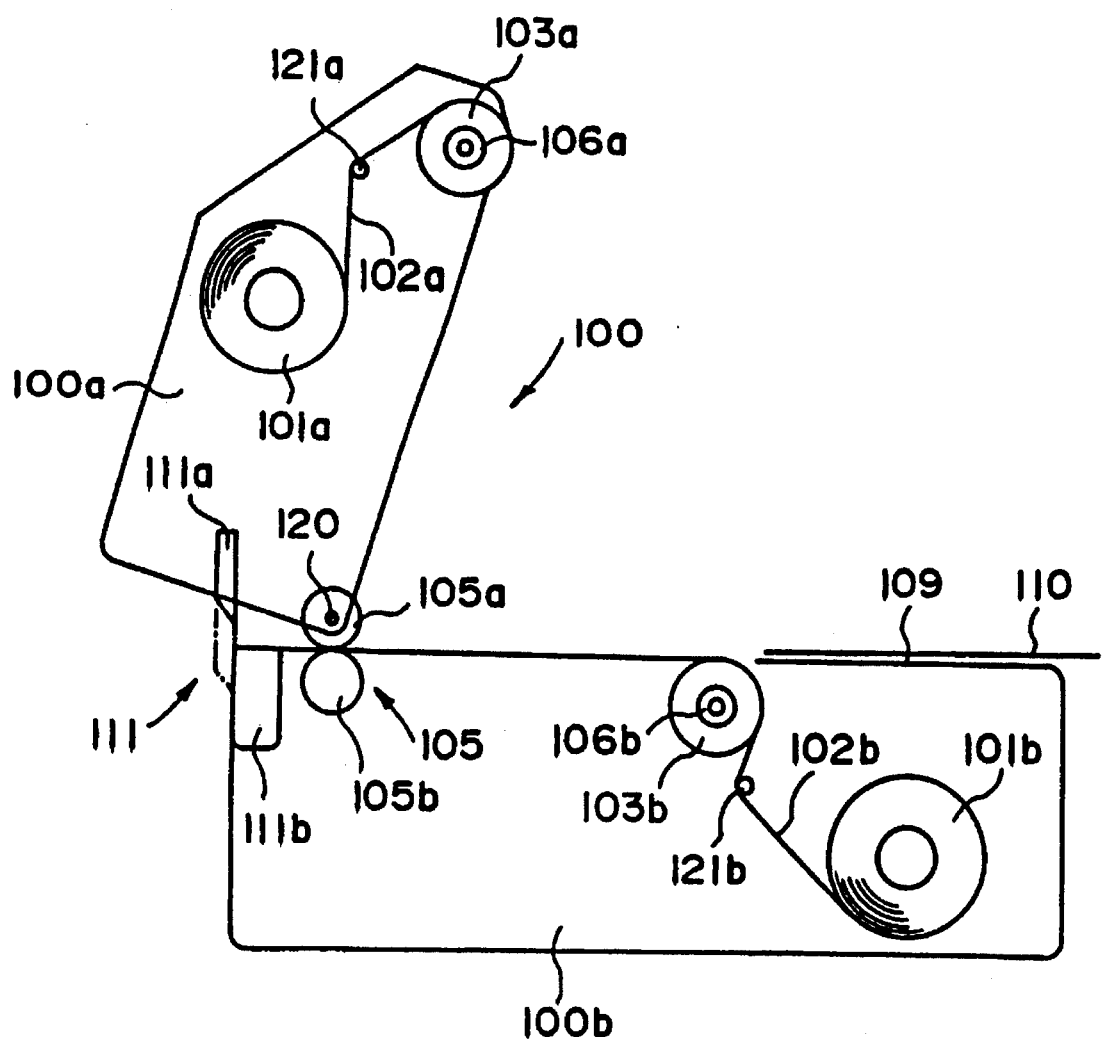
FIG. 18 is an elevational sectional view of the apparatus of FIG. 17 showing a condition that an upper body frame is opened.

When the upper frame 1a is closed, the cutter 17 assumes a position shown in FIG. 14B. In this condition, the laminate sheet (laminate object after being laminate-treated) is positioned between the cutter 17a and the die 17b. When a cutting command is sent to the cutter motor 79 at a predetermined timing, the cam 77 is rotated in an anti-clockwise direction to lower the upper blade shaft 172, thus lowering the cutter 17a. Consequently, the laminate sheet is cut by the cutter unit 17 in a condition shown in FIG. 14C.

Next, a drive system will be explained with reference to FIG. 13.

Figure 13:
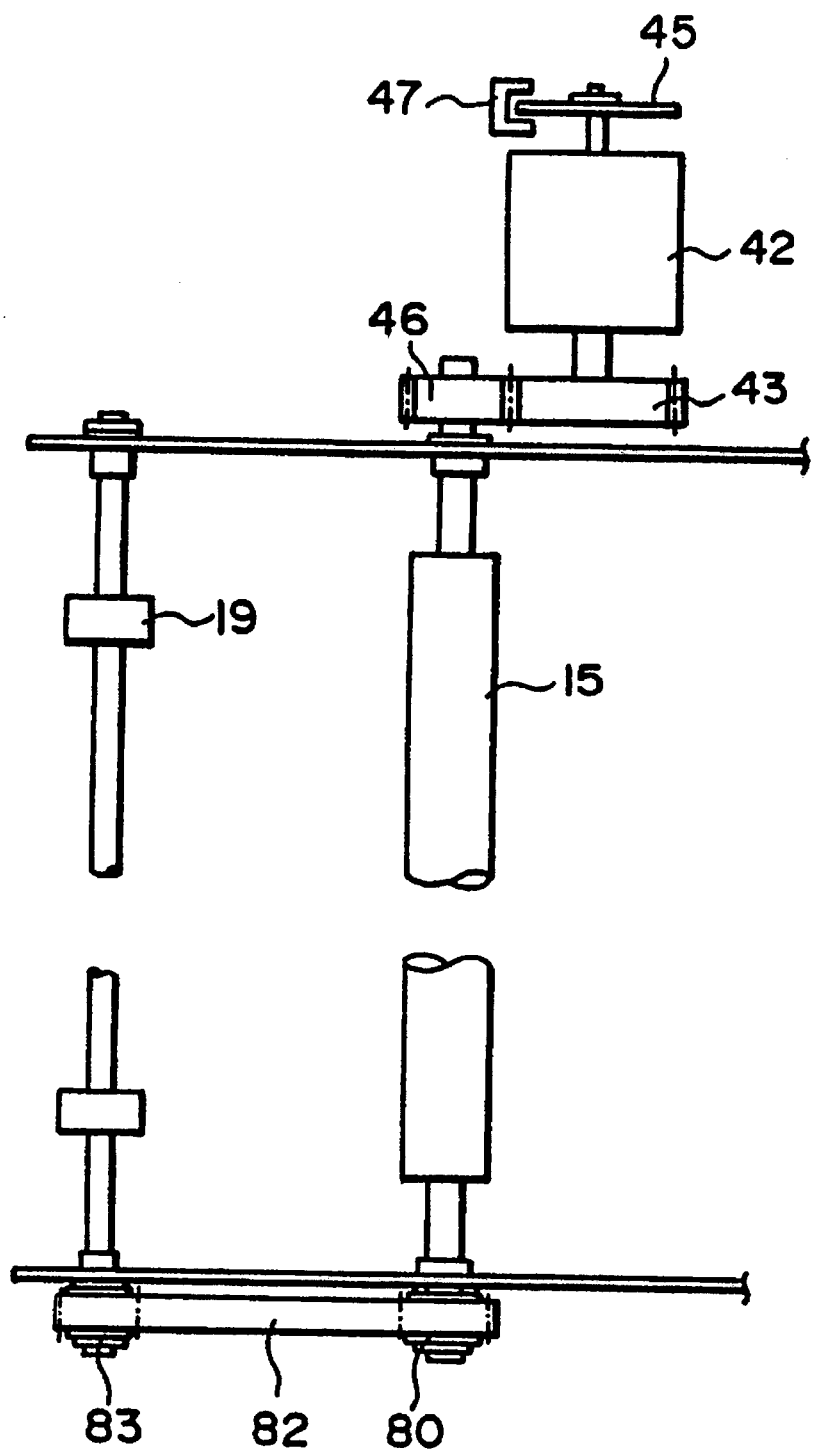
FIG. 13 is a development view showing a drive system of the laminating apparatus.

FIG. 13 is a development view showing the drive system of the laminating apparatus according to this embodiment.

In FIG. 13, a main motor 42 has an output shaft on which a motor gear 43 is fixedly mounted. A rotational force of the main motor 42 is transmitted to a pull roller gear 46 through the motor gear 43 to drive the pull roller pair 15. A clock disc 45 having a plurality of slits circumferentially equidistant from each other is attached to a motor shaft opposite to the motor gear 43. A clock sensor 47 comprising an optical sensor of a permeable type for detecting the slit is disposed near the clock disc 45. A drive pulley 80 is secured to a roller shaft of one of the pull rollers 15. The driving force transmitted to the pull roller pair 15 is transmitted from the drive pulley 80 to a pulley 83 of the ejector roller pair 19 via a belt 82, thereby driving the ejector roller pair 19.

Next, the laminate treatment of the laminate object 20 in the apparatus according to this embodiment will be explained with reference to FIGS. 11 and 6.

The laminate object 20 is rested on the platform 21 (FIG. 11) and inserted into the introduction opening 22a until the leading end of the laminate object abuts against the shutter member 26. When the laminate object 20 is detected by the sensor 27, a shutter solenoid (not shown) is turned ON, thus retracting the shutter member 26 from the platform 21. At the same time, a pick-up solenoid 50 (see FIG. 6) is turned ON, thus lowering the pick-up roller 25 to urge the laminate object 20 against the platform 21 with a predetermined pressure.

Thereafter, a motor is turned ON to rotate the roller 25. The laminate object 20 is fed by the rotation of the roller 25. After a predetermined time period has elapsed, the main motor 42 is turned ON, thus starting the pull roller pair 15 to rotate. The laminate films 6a, 6b are pulled by the pull roller pair 15, and the pressure and heat roller pair 10 and the pre-heat rollers 9a, 9b are rotatingly driven by the movement of the pulled laminate films. The laminate films 6a, 6b which are not adhered to each other are heated to a first temperature by means of the previously heated pre-heat rollers 9a, 9b, and then are heated to a second temperature (controlled to have always constant value) by means of the pressure and heat roller pair 10.

The laminate object 20 is fed to a nip between the pressure and heat rollers 10a, 10b by the pick-up roller 25 and is sandwiched between upper and lower heated laminate films 6a, 6b. In this condition, the laminate object 20 together with the laminate films are laminate-treated by being pressurized and heated by the pressure and heat rollers 10a, 10b. After the pick-up roller 25 is rotated for a predetermined time period, the pick-up solenoid 50 is activated to retract the pick-up roller 25 from the platform 21, and, when the pick-up motor 51 is turned OFF, the pick-up roller is stopped.

When the trailing end of the laminate object 20 is detected by the sensor 27, the number of slits of the clock disc 45 is counted by the clock sensor 47. After a distance between the sensor 27 and the cutter unit 17 is calculated, the main motor 42 is turned OFF, thus stopping the feeding of the laminate-treated laminate object 20. At the same time, the cutter motor 79 is turned ON, whereby the trailing ends of the laminate films 6a, 6b sealingly sandwiching the laminate object 20 are cut by the cutter 17a. The completed laminate sheet is ejected by the ejector rollers 19 onto an ejector tray (not shown) out of the apparatus.

By repeating the above-mentioned sequences, one or more laminate objects 20 are successively laminate-treated.

According to the above-mentioned third embodiment of the present invention, in the laminating apparatus wherein the object 20 to be laminated is laminate-treated by pressurizing the same while sandwiching the object with the upper and lower laminate films 6a, 6b, the pressure and heat rollers 10a, 10b (urged against each other) for overlapping the laminate films 6a, 6b and the cutter unit 17 are supported by the upper and lower frame 1a, 1b in division or lots, respectively and are divisible. Thus, since the operator can securely set the laminate films 6a, 6b in the feeding path by a manual operation using his hands and checking the laminate films 6a, 6b with his eyes during the loading of the laminate films to the laminating apparatus, it is possible to prevent the formation of wrinkles in the laminate films and to align the lateral edges of the laminate films with each other without fail. As a result, even a inexperienced can operator and easily securely set the load and laminate films in a short time.

Incidentally, even in the third embodiment, the laminate film roll unit Y including the laminate roll 5a (5b), tension roller 7a (7b, 7c) and the like may be used, as in the first and second embodiments. In this case, since it is not needed to wind the laminate film 6a (6b) around the tension roller 7a (7b, 7c), the setting of the laminate film can more easily and securely be performed.

What is claimed is:

1. A laminating apparatus for performing laminate treatment by overlapping a laminate object with a laminate film, comprising:

laminate film containing means for containing the laminate film;

overlapping means for overlapping the laminate object with the laminate film fed from said laminate film containing means;

guiding means for guiding the laminate film from said laminate film containing means to said overlapping means;

support means for supporting said laminate film containing means and said guiding means, said support means being removably mounted on said laminating apparatus together with said laminate film containing means and said guide means; and a guide rail for guiding said support means between an outside position and a set position in said laminating apparatus.

2. A laminating apparatus according to claim 1, wherein said laminate film containing means comprises a laminate film roll including a strip-shaped laminate film wound to form a plurality of revolutions and capable of being unwound from said laminate film roll to be used in the laminate treatment, and holding means for holding said laminate film roll.

3. A laminating apparatus according to claim 2, wherein said guiding means comprises rollers for guiding the laminate film unwound from said laminate film roll to said overlapping means.

4. A laminating apparatus according to claim 3, wherein said rollers comprise tension rollers for applying a predetermined tension force to the laminate film unwound from said laminate film roll.

5. A laminating apparatus according to claim 1, wherein said guide rail is provided with a positioning portion for positioning said support means in the set position.

6. A laminating apparatus according to claim 1, wherein said overlapping means comprises a pair of pressure rollers, and wherein the laminate film and the laminate object are pressurized between said pair of pressure rollers.

7. A laminating apparatus according to claim 6, wherein said pair of pressure rollers comprises heating means for heating the laminate film during the pressurization of the laminate film and the laminate object.

8. A laminating apparatus according to claim 1, further including cutter means for cutting, at a predetermined position, the laminate film unwound from a laminate film roll.

9. A laminating apparatus for performing a laminate treatment by sandwiching a laminate object with a first laminate film and a second laminate film, comprising:

first laminate film containing means for containing the first laminate film;

second laminate film containing means for containing the second laminate film;

sandwiching means for sandwiching the laminate object with the first and second laminate films fed from said first and second laminate film containing means;

guide means for guiding the first laminate film containing means to said sandwiching means;

support means for supporting said first laminate film containing means and said guide means;

an apparatus body for containing the first and second laminate films, said sandwiching means, said guide means and said support means, said apparatus body including a first body and a second body openable to each other; and a guide rail for guiding said support means between an outside position and a set position in said apparatus body, wherein said support means is removed when said first and second bodies are opened.

10. A laminating apparatus according to claim 9, wherein each of said first and second laminate film containing means comprises a laminate film roll including strip-shaped laminate film wound to form a plurality of revolutions and capable of being unwound from said laminate film roll to be used in a laminate treatment, and holding means for holding said laminate film roll.

11. A laminating apparatus according to claim 10, wherein said guide means comprises rollers for guiding the laminate films unwound from said laminate film rolls to said sandwiching means.

12. A laminating apparatus according to claim 11, wherein said rollers comprise tension rollers for applying a predetermined tension force to the laminate films unwound from said laminate film rolls.

13. A laminating apparatus according to claim 9, wherein said sandwiching means comprises a pair of pressure rollers for pressurizing the laminate films and the laminate object, and one pressure roller of said pair of pressure rollers is disposed in each of said first and second bodies, respectively, such that said pair of pressure rollers are separated from each other when said first and second bodies are opened.

14. A laminating apparatus according to claim 13, wherein said pair of pressure rollers comprises heating means for heating the laminate films during the pressurization of the laminate film and the laminate object.

15. A laminating apparatus according to claim 9, further including cutter means for cutting, at a predetermined position, the laminate films unwound from a plurality of laminate film rolls.

16. A laminating apparatus according to claim 15, wherein said cutter means comprises a movable cutter blade and a fixed cutter blade, and said movable cutter blade is disposed in one of said first and second bodies and said fixed cutter blade is disposed in the other of said first and second bodies.

17. A laminating apparatus according to claim 16, further comprising
positioning means for positioning said cutter blades in a cutting position, wherein said two cutter blades are separated from each other when said first and second bodies are opened, and are positioned in the cutting position by said positioning means when said first and second bodies are closed.

18. A laminating apparatus according to claim 17, further comprising drive means for driving said movable cutter blade and operating said cutter blade to cooperate with said fixed cutter blade to cut the laminate film.

19. A laminating apparatus according to claim 17, further including a pair of feed rotary members for feeding the laminate film to said cutter means, and said pair of feed rotary members feed the laminate film by pinching the laminate film therebetween, and one feed rotary member of said pair of feed rotary members is disposed in said first body and the other feed rotary member is disposed in said second body such that said pair of feed rotary members are separated from each other when said first and second bodies are opened.

20. A laminating apparatus according to claim 17, further including locking means for locking said first and second bodies to each other when they are closed.

21. An image forming system for performing a laminate treatment by overlapping a laminate object, on which an image was formed by an image forming means, with a laminate film, comprising:
laminate film containing means for containing the laminate film;

overlapping means for overlapping the laminate object with the laminate film fed from said laminate film containing means;

guiding means for guiding the laminate film from said laminate film containing means to said overlapping means;

support means for supporting said laminate film containing means and said guiding means, said support means being removably mounted on said image forming system together with said laminate film containing means and said guide means; and a guide rail for guiding said support means between an outside position and a set position in said laminating apparatus.

22. An image forming system according to claim 21, wherein said laminate film containing means comprises a laminate film roll including a strip-shaped laminate film wound to form a plurality of revolutions and capable of being unwound from said laminate film roll to be used in the laminate treatment, and holding means for holding said laminate film roll.

23. An image forming system according to claim 22, wherein said feeding means comprise rollers for guiding the laminate film unwound from said laminate film roll to said overlapping means.

24. An image forming system according to claim 23, wherein said overlapping means comprises a pair of pressure rollers, and wherein the laminate film and the laminate object are pressurized between said pair of pressure rollers.

25. A laminating apparatus according to claim 17, wherein said positioning means comprises a shaft mounted onto said cutter member disposed on said first body and a cutter bearing disposed on said second body for receiving said shaft when said first and second bodies are closed.

26. An image forming system for performing laminate treatment for sandwiching a laminate object, on which an image was formed by an image forming means, with a first laminate film and second laminate film, comprising:
first laminate film containing means for containing the first laminate film;

second laminate film containing means for containing the second laminate film;

sandwiching means for sandwiching the laminate object with the first and second laminate films fed from said first and second laminate film containing means;

guide means for guiding the first laminate film containing means to said sandwiching means;

support means for supporting said first laminate film containing means and said guide means;

an apparatus body for containing the first and second laminate films, said sandwiching means, said guide means and said support means, said apparatus body including a first body and a second body openable to each other; and a guide rail for guiding said support means between an outside position and a set position in said apparatus body, wherein said support means is removed when said first and second bodies are opened.

27. A laminating apparatus according to claim 18, wherein said drive means comprises a cam rotated by a rotation drive source.

* * * * *

UNITED STATES PATENT AND TRADEMARK OFFICE
CERTIFICATE OF CORRECTION

PATENT NO. : 5,480,509
DATED : January 2, 1996
INVENTOR(S) : Matsuo et al.

It is certified that error appears in the above-indentified patent and that said Letters Patent is hereby corrected as shown below:

COLUMN 1:

Line 4, "07/735,632filed" should read --07/735,632 filed--.
Line 42, "sandwiching" should read --sandwiched--.

COLUMN 2:

Line 27, "to use the" should be deleted.
Line 53, "Laminate" should read --laminate--.
Line 65, "has" should read --has an--.

COLUMN 3:

Line 13, "by" should be deleted.

COLUMN 4:

Line 32, "means; 10 FIG." should read --means; FIG.--.

COLUMN 5:

Line 65, "FIG. 1" should read --FIG. 1)--.

COLUMN 7:

Line 47, "pre-heated" should read --pre-heat--.

UNITED STATES PATENT AND TRADEMARK OFFICE
CERTIFICATE OF CORRECTION

PATENT NO. : 5,480,509  Page 2 of 3
DATED : January 2, 1996
INVENTOR(S) : Matsuo et al.

It is certified that error appears in the above-indentified patent and that said Letters Patent is hereby corrected as shown below:

COLUMN 8:

Line 5, "aimed" should be deleted.
Line 60, "the body" should read --the upper body--.

COLUMN 9:

Line 43, "101b" should read --1b--.

COLUMN 10:

Line 64, "FIG, 6)" should read --FIG. 6)--.

COLUMN 11:

Line 53, "a inexperienced can" should read --an inexperienced operator can securely--.
Line 54, "operator and easily securely set the load and" should read --and easily load and set the--.

COLUMN 13:

Line 37, "comprising" should read --comprising:--.

UNITED STATES PATENT AND TRADEMARK OFFICE
CERTIFICATE OF CORRECTION

PATENT NO. : 5,480,509
DATED : January 2, 1996
INVENTOR(S) : Matsuo et al.

It is certified that error appears in the above-indentified patent and that said Letters Patent is hereby corrected as shown below:

COLUMN 14:

Line 24, "feeding" should read --guiding-- and "comprise" should read --comprises--.

Signed and Sealed this

Twenty-fifth Day of June, 1996

Attest:

BRUCE LEHMAN

Attesting Officer          Commissioner of Patents and Trademarks